United States Patent [19]

White et al.

[11] Patent Number: 4,538,192
[45] Date of Patent: Aug. 27, 1985

[54] VENTILATION SYSTEM FOR COMPUTER DISC DRIVE HUB ASSEMBLY

[75] Inventors: James N. J. White, Kinross; Michael G. Caithness, Fife, both of Scotland

[73] Assignee: Rodime Limited, United Kingdom

[21] Appl. No.: 388,165

[22] Filed: Jun. 14, 1982

[51] Int. Cl.³ .............................................. G11B 5/012
[52] U.S. Cl. ..................................................... 360/98
[58] Field of Search ..................................... 360/97–99

[56] References Cited

U.S. PATENT DOCUMENTS

| | | | |
|---|---|---|---|
| 3,688,289 | 8/1972 | Schnell et al. | 360/98 |
| 3,867,723 | 2/1975 | Penfold et al. | 360/98 |
| 3,969,767 | 7/1976 | Griffiths et al. | 360/99 |
| 4,054,931 | 10/1977 | Bolton et al. | 360/97 |
| 4,106,066 | 8/1978 | Kudo | 360/133 |

OTHER PUBLICATIONS

Barbeau et al., "Spaced . . . Ventilation", IBM Tech Disc Bull, vol. 17, No. 3, Aug. 1974, p. 814.

Primary Examiner—Robert S. Tupper
Attorney, Agent, or Firm—Murray, Whisenhunt and Ferguson

[57] ABSTRACT

A ventilation system for use with a computer disc drive is described which enables disc file data storage capacity to be increased for a given volume of chamber housing the discs and which provides increased disc-drive performance. A plurality of axially extending channels is provided in the hub of the drive and a breather filter is located axially, at one end of the hub, in the housing wall of the chamber. Rotation of the discs causes air to be thrown out to the periphery of the discs creating a high pressure zone thereat and a low pressure zone at the rotation axis. Air is drawn into the low pressure zone and is communicated to the inter disc spaces via the axially extending channels from where it is thrown out by centrifugal force during rotation. A substantially constant air density is provided adjacent the disc surfaces leaving the aerodynamic characteristics of the read/write heads substantially unaffected and facilitating the reduction of interdisc spacing. The breather filter location ensures that external air is drawn into the chamber opposite the zone of lowest pressure during switch-on and since this air is filtered it is clean. When the disc rotation stabilizes the pressure difference across the breather filter is zero.

2 Claims, 6 Drawing Figures

VENTILATION SYSTEM FOR COMPUTER DISC DRIVE HUB ASSEMBLY

The present invention relates to a ventilation system for use with a computer disc drive.

In (5¼") computer disc drives with fixed depth dimensions two or three discs are mounted in parallel on a rotating hub assembly. One restriction in providing more than three discs in parallel is the spacing required between each pair of discs. This is typically 0.3" minimum. Typical disk thickness is 0.075".

In order to increase the number of disks and hence the data capacity available within the specified drive dimensions, one solution is to decrease the spacing between the discs.

In general the rotation of the discs causes movement of the air between the discs. Air viscosity leads to a tangential flow of air in contact with the rotating disc surfaces; centrifugal forces tend to expel air radially outwards. The net effect is an outward spiral of air from the hub to the periphery of the discs. In order to maintain air density and hence sufficient pressure to satisfactorily support the air bearing of a spring-mounted magnetic read/write head over the required recording bands on the discs it is desirable to ensure a return path of air to the hub. With an inter-disc spacing of 0.3" or greater one such path is along a plane midway between the disc surfaces. When the spacing is reduced below 0.3" this recirculation path becomes less effective and eventually leads to a reduction in air density and to less desirable conditions for support of the read/write head with consequent deterioration in flying behaviour and overall performance of the disc drive.

An object of the present invention is to obviate or mitigate the abovesaid disadvantages. Air which returns to the hub axis along the housing of the drive, that is along the walls above the top disc and below the bottom disc, is allowed into the interdisc spacings by venting it through the hub itself.

An equally important requirement of computer disc drives is a high degree of cleanliness of the air that circulates between the discs and supports the read/write heads. A potential source of contamination is the bearing assembly which supports the hub on which the discs are mounted. During normal operation of a disc drive conditions may exist where dirt particles may leak into the disc enclosure from these bearings and lead to deterioration of performance of the read/write heads or the discs.

A further object of the present invention is to minimise contamination from the hub bearing assembly.

According to a first aspect of the present invention there is provided a ventilation system for a computer disc drive comprising a hub assembly for supporting a plurality of discs, the hub assembly having ventilation means therein, said ventilation means interconnecting the space extending axially of the hub, with the spaces between adjacent discs.

Preferably said ventilation means is a plurality of axially extending channels arranged and disposed around the axis of the hub assembly. Alternatively, the axially extending channels may be disposed on the periphery of the hub assembly.

According to a second aspect of the present invention there is provided ventilation means for a computer disc drive housing in which discs are mounted on a hub assembly, comprising air ventilating and filtering means located in the housing directly opposite a zone where pressure in the chamber is lowest.

Preferably said air ventilating and filtering means are located axially of the hub assembly.

Embodiments of the first and second aspects of the present invention will now be described by way of example with reference to the accompanying drawings in which.

Figure 1:
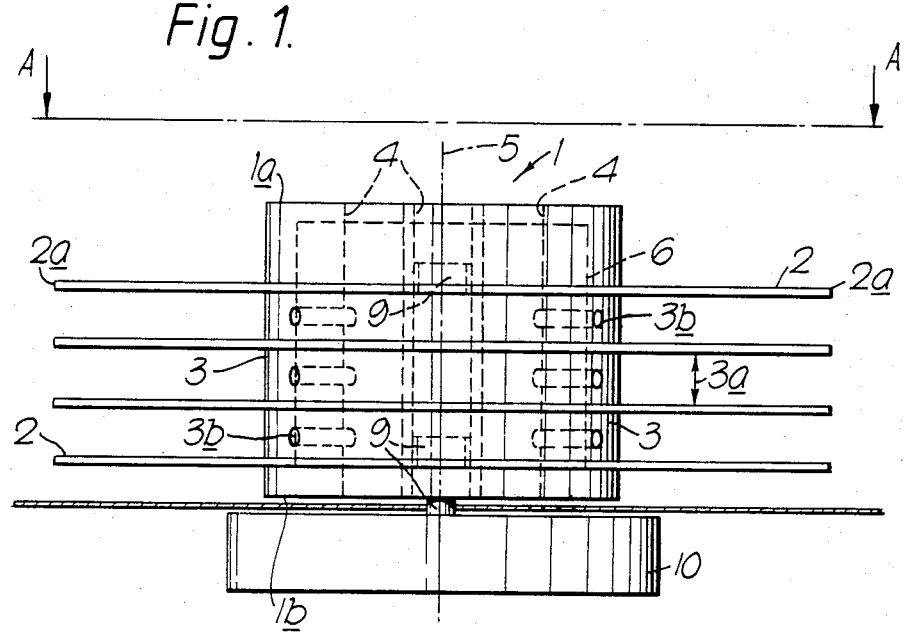
FIG. 1 is a side view of a ventilating system for a hub assembly according to the first aspect of the present invention.
Figure 2:
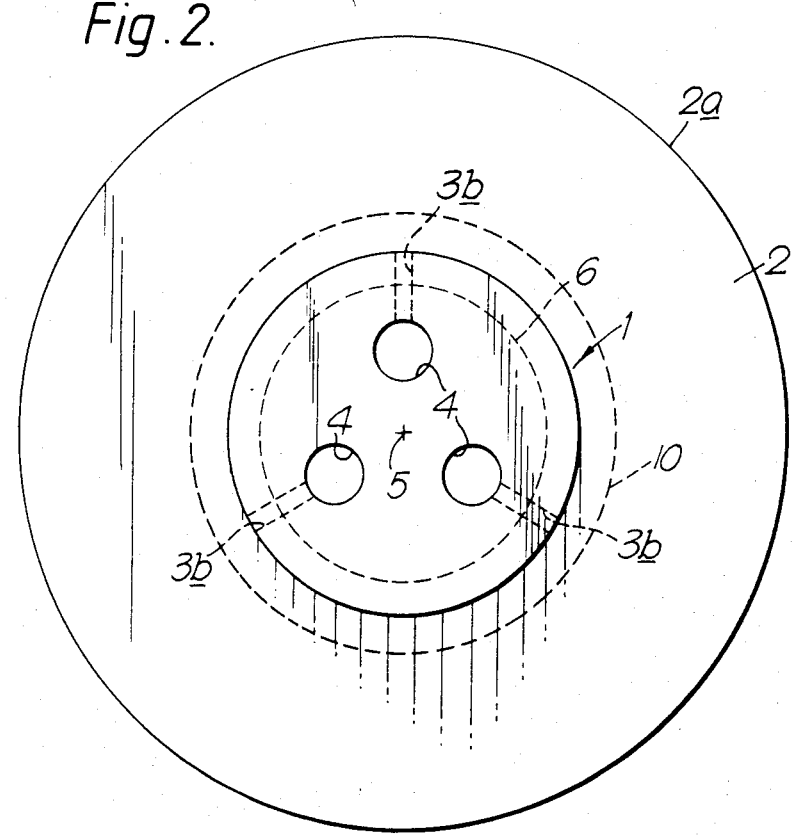
FIG. 2 is a view taken in the direction A—A of FIG. 1.

Referring now to FIGS. 1 and 2 of the drawings, a hub assembly 1 has four discs 2 mounted thereon, the discs being separated by spacers 3 and the spacing 3a between adjacent discs being about 0.25". Each spacer has apertures 3b located therein to permit the flow of air therethrough. Within the hub assembly 1 there is located axially extending interconnecting channels 4 which are disposed around the axis 5 (FIG. 2) of the hub assembly 1.

In use, as the hub assembly 1 and discs 2 rotate, centrifugal forces drive air from near the periphery 6 of the hub assembly to the periphery 2a of the discs 2. At the axial ends 1a, 1b of the hub assembly 1 low pressure zones are located which receive air circulated from the higher pressure disc peripheries 2a. The generated air pressure gradient draws the air down through the interconnecting channels 4 through apertures 3b out into spaces 3a between discs 2. Thus there is provided a ventilation system which maintains air density between adjacent discs so that the aerodynamic characteristics of the read/write heads are substantially unaffected. This enables a plurality of discs to be stacked with reduced interdisc spacing and consequently the disk file data storage capacity for a given spacial volume is proportionately increased.

Other modifications can be made to the embodiment without affecting the scope of the invention. For example, the interconnecting channels can be of any geometry as long as they satisfy the criteria that the spaces adjacent to the axial ends of the hub assembly are interconnected with each of the spaces between adjacent discs. In addition, the hub assembly may comprise several parts, one of which contains the interconnecting channels.

Figure 3:
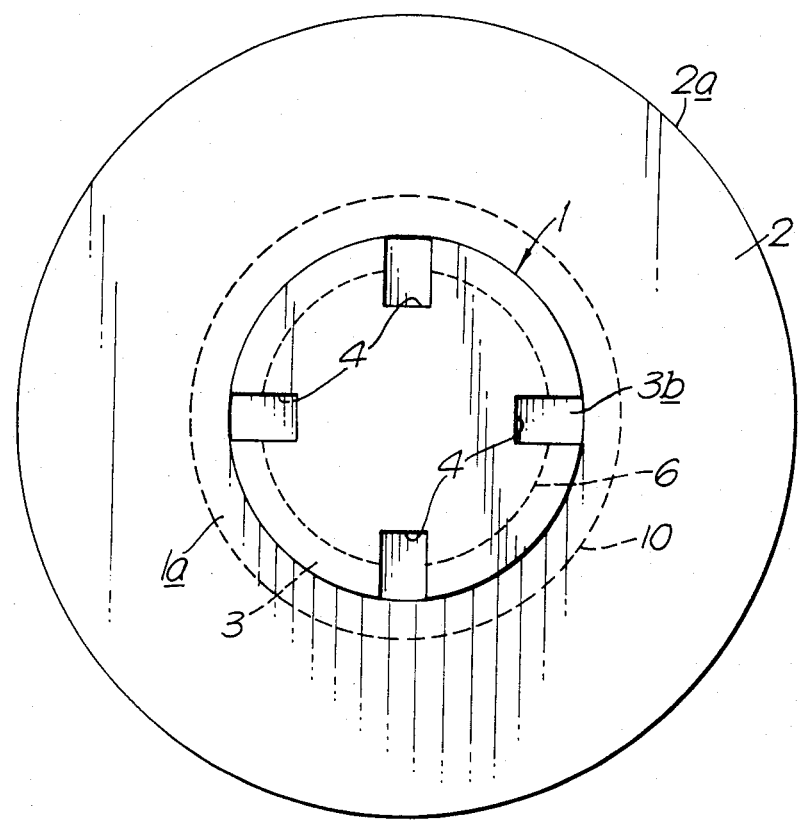
FIG. 3 is similar to FIG. 2 but shows axiallt extending channels located on the periphery of the hub assembly.

FIG. 3 shows axially extending channels 4 with the spacers 3 being castellated in order to facilitate flow of air into interdisc spaces 3a.

Figure 4:
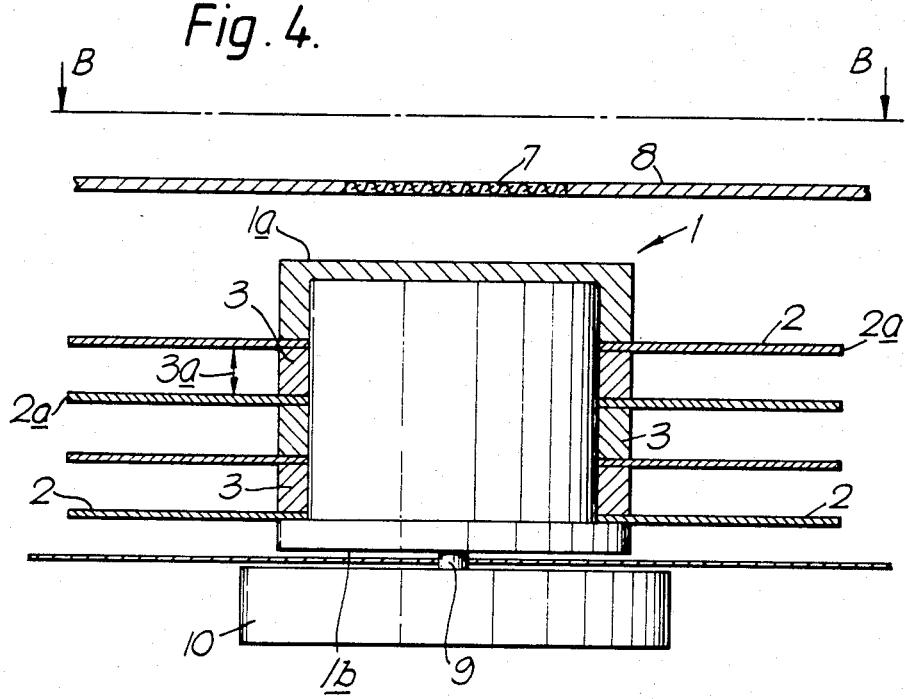
FIG. 4 is a view similar ti FIG. 1 according to the second aspect of the invention.
Figure 5:
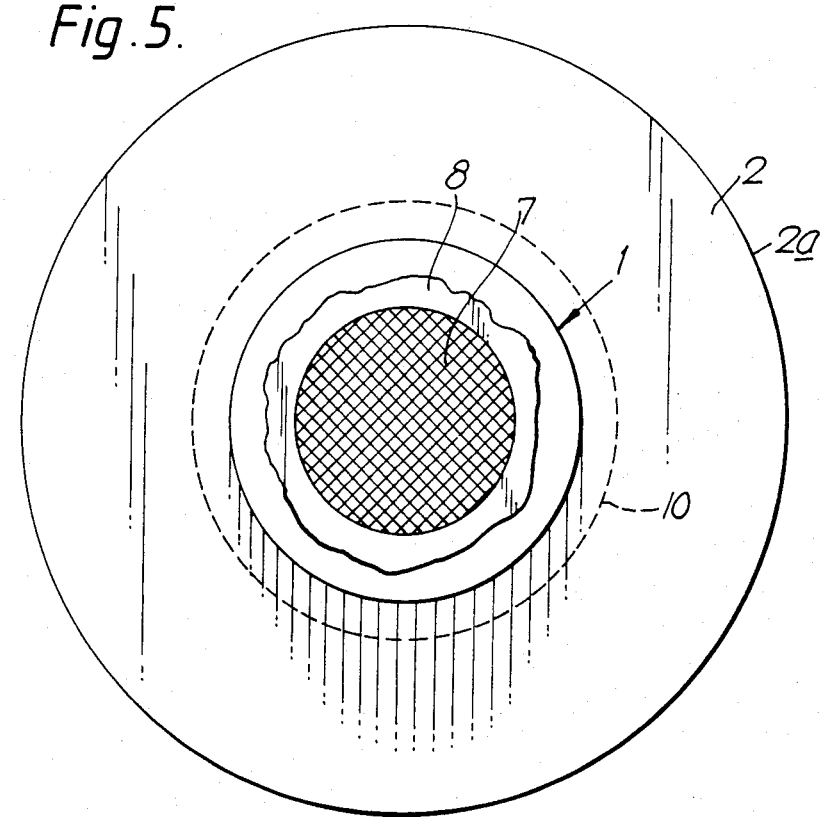
FIG. 5 is a view taken in the direction B—B of FIG. 4.

Referring to FIGS. 4 and 5 an air 'breather' filter 7 is located in the housing 8 axially of the hub end 1a. The primary purpose of a breather filter is to equalise air pressure inside the hermetically sealed disc drive to atmospheric pressure, mainly to facilitate shipment or storage of the disc drive over a range of ambient air pressures. When the hub assembly 1 begins to rotate, a low pressure air zone is generated axially at each end of the hub 1a, 1b and air at a higher pressure is drawn from the atmosphere external to the disc drive through the filter into the chamber. This therefore becomes 'clean' air. When the hub assembly 1 has reached its operating rotational velocity and pressure gradients have established within the disc drive, the hub assembly 1 will remain at the point of lowest pressure. Because the breather filter is positioned opposite the end 1a, this low pressure is equal to atmospheric pressure. Hence there is no static pressure drop across the hub bearings from outside to inside and therefore less tendency for the ingress of unfiltered and contaminated air at end 1b. However, if the filter 7 were not located axially of the end 1a then the low pressure zone produced axially of end 1b would be lower than atmospheric pressure and therefore more likely to cause unfiltered air to be drawn into the chamber 10 through the bearings 9 of the hub assembly, tending also to displace lubricant into the chamber. This will produce the undesirable effects of contamination of the disc chamber and reduction in bearing lubricant. Either effect can seriously impair the disc drive performance.

Note also that there is a further disadvantage at initial rotation of the disc stack if the filter 7 is not located axially of the end 1a. The initially generated low pressure zone at the hub axis will cause a rapid pressure gradient across the hub bearings causing an undesirable ingress of contaminated air. With the filter 7 placed on the hub axis the air ingress will take place primarily through the filter.

Of course, a filter could be provided at the end 1b of the hub but, this would be much more complicated with no further advantage.

Figure 6:
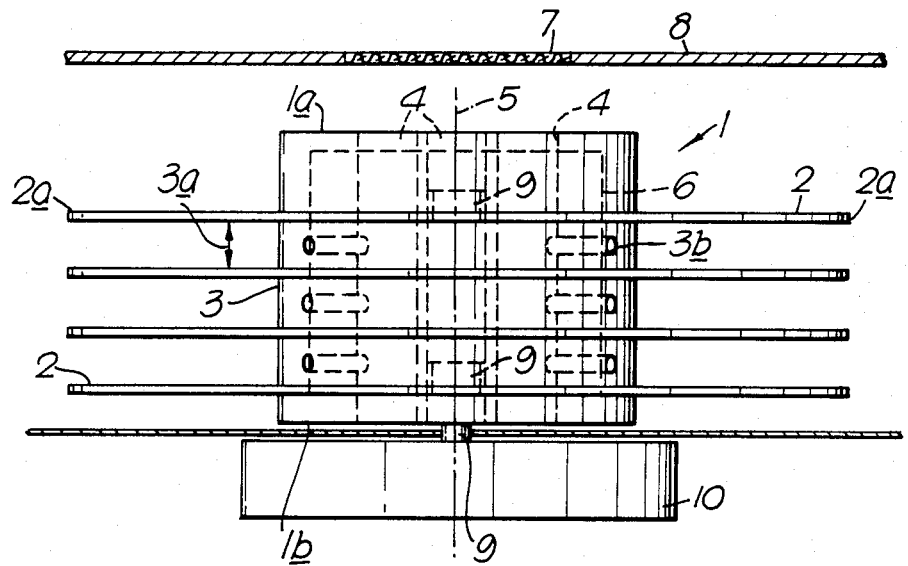
FIG. 6 is a view similar to FIGS. 1 and 4 according to both first and second aspects of the present invention.

Referring now to FIG. 6, the first and second aspects of the invention are shown in combination, with the filter 7 being located axially of the hub end 1a, the hub assembly being provided with interconnecting ventialting channels 4.

Without departing from the scope of the invention it should be understood that the hub assembly may be indirectly driven from the motor 10 by means of a belt and pulley drive system.

Advantages of the present invention include ease and low cost of implementation, provision of increased data storage capability for a given depth dimension and spacial volume and improved contamination control and disc drive reliability.

We claim:

1. A computer disc drive including a hub assembly supporting a plurality of axially-stacked discs and a housing defining a chamber, said chamber enclosing said hub assembly, said hub assembly having a plurality of axially extending channels interconnecting the space adjacent the axial ends of the hub with the spaces between the discs via a plurality of radially extending channels, said housing having air ventilating and filtering means therein, said ventilating and filtering means comprising a breather filter located in said housing co-axially with the axis of the hub assembly, said breather filter interconnecting the interior of the chamber with the outside atmosphere, the air enclosed by the chamber being circulated within the chamber via said axially and radially extending channels by the pumping action of the rotating discs, said circulation of air causing pressure gradients to be established within the chamber wherein the spaces adjacent the axial ends of said hub assembly are the points of lowest pressure, said points of lowest pressure being at atmospheric pressure by virtue of the co-axial location of said breather filter.

2. A computer disc drive as claimed in claim 1 wherein said axially extending channels are arranged ind disposed around the periphery of the hub assembly.

* * * * *